United States Patent
DeLong

(10) Patent No.: US 10,328,780 B2
(45) Date of Patent: Jun. 25, 2019

(54) TONNEAU COVER SYSTEM WITH AUTOMATIC STOWING LATCH

(71) Applicant: Extang Corporation, Ann Arbor, MI (US)

(72) Inventor: Ryan W. DeLong, Stockbridge, MI (US)

(73) Assignee: Extang Corporation, Ann Arbor, MI (US)

( * ) Notice: Subject to any disclaimer, the term of this patent is extended or adjusted under 35 U.S.C. 154(b) by 25 days.

(21) Appl. No.: 15/683,194

(22) Filed: Aug. 22, 2017

(65) Prior Publication Data

US 2019/0061498 A1 Feb. 28, 2019

(51) Int. Cl.
*B60P 7/02* (2006.01)
*B60J 7/19* (2006.01)
*B60J 7/14* (2006.01)

(52) U.S. Cl.
CPC .............. *B60J 7/198* (2013.01); *B60J 7/141* (2013.01)

(58) Field of Classification Search
CPC .................................. B60J 7/198; B60J 7/141
See application file for complete search history.

(56) References Cited

U.S. PATENT DOCUMENTS

| | | |
|---|---|---|
| 5,636,893 A | 6/1997 | Wheatley et al. |
| 7,484,788 B2 | 2/2009 | Calder et al. |
| 7,537,264 B2 | 5/2009 | Maimin et al. |
| 8,262,148 B2 | 9/2012 | Rusher et al. |
| 8,348,328 B2 | 1/2013 | Walser et al. |
| 8,511,736 B2 | 8/2013 | Williamson et al. |
| 8,960,765 B2 * | 2/2015 | Facchinello ............ B60J 7/141 296/100.06 |
| 9,211,834 B2 | 12/2015 | Facchinello et al. |
| 9,555,735 B2 * | 1/2017 | Kerr, III .................... B60P 7/02 |
| 2011/0101727 A1 * | 5/2011 | Rusher ..................... B60J 7/141 296/100.18 |
| 2016/0200375 A1 * | 7/2016 | Kerr, III ................... B60J 7/141 296/100.07 |
| 2017/0291478 A1 * | 10/2017 | Hall ......................... B60J 7/198 |
| 2018/0201106 A1 * | 7/2018 | Facchinello ............. B60J 7/141 |

* cited by examiner

*Primary Examiner* — Lori L Lyjak
(74) *Attorney, Agent, or Firm* — Harness, Dickey & Pierce, P.L.C.

(57) ABSTRACT

A tonneau cover can include at least one pair of cooperating locking elements coupled thereto with the cooperating locking elements being positioned to engage and automatically lock with each other when rearward sections of the tonneau cover are folded onto the forward section and into a stack. Thus, the cooperating locking elements can operate to retain the sections together in the stack when locked with each other.

26 Claims, 13 Drawing Sheets

TONNEAU COVER SYSTEM WITH AUTOMATIC STOWING LATCH

FIELD

The present disclosure relates to tonneau cover systems for a cargo box of a truck that include devices for retaining the tonneau cover in an open, or stowed configuration.

BACKGROUND

This section provides background information related to the present disclosure which is not necessarily prior art.

Tonneau cover systems can include a tonneau cover with hinged sections that are foldable between a closed configuration in which the sections are arranged to cover the cargo box and an open configuration in which the sections are arranged in a stack with the rearward sections stacked upon the forward section. Two straps are typically used to buckle the stacked sections together. These straps help maintain the sections in the stack while the truck is traveling down the highway with the tonneau cover in the open, stacked configuration.

Unfortunately, sometimes users forget to buckle any of the straps so that nothing prevents the tonneau cover from becoming unstacked when subjected to high winds. In other cases, users sometimes only buckle one of the straps on one side stack adjacent one side of the cargo box, which allows high winds to expand the other side of the stack adjacent the other side of the cargo box. Of course, the effect of the wind on the stack increases as the stack expands. In either case, damage to cargo in the cargo box, to the tonneau cover, to the truck, or worse, can occur.

SUMMARY

This section provides a general summary of the disclosure, and is not a comprehensive disclosure of its full scope or all of its features.

In accordance with one aspect of the present disclosure, a tonneau cover system for a cargo box of a truck is provided. The tonneau cover system can include a tonneau cover having a plurality of sections hingedly coupled together. The plurality of sections can include a forward section and a plurality of rearward sections. The tonneau cover can be foldable between a closed configuration in which the plurality of sections are arranged in a first plane to cover the cargo box and an open configuration in which the plurality of sections are arranged in a stack with the rearward sections stacked upon the forward section. At least one pair of cooperating locking elements can be coupled to the tonneau cover with the cooperating locking elements being positioned to engage and automatically lock with each other when the rearward sections are folded onto the forward section in the stack. The cooperating locking elements can operate to retain the sections together in the stack when locked with each other.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
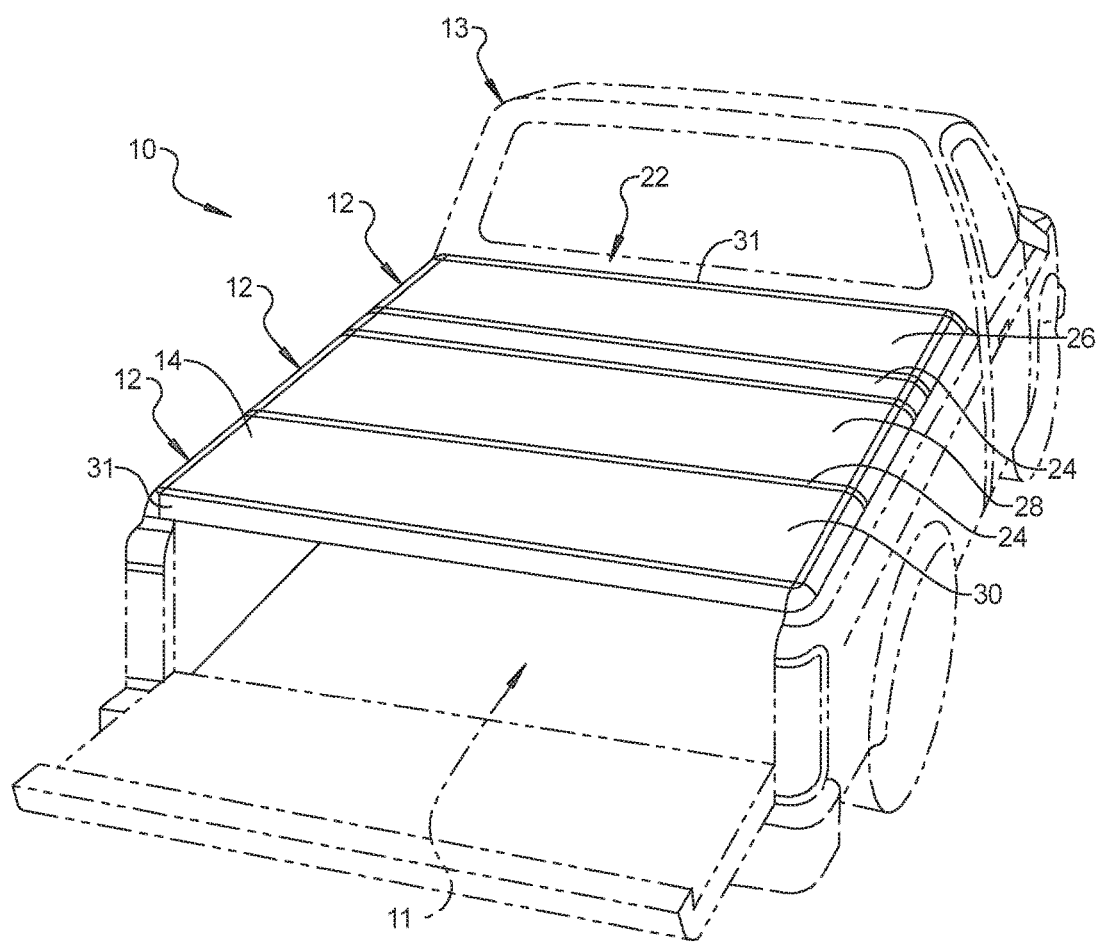
FIG. 1 is a perspective view of a first example embodiment of a tonneau cover system in accordance with the present disclosure mounted on a cargo box of a pickup truck.

Example embodiments will now be described more fully with reference to the accompanying drawings.

FIGS. 1-9B illustrate one exemplary tonneau cover system 10 for covering a truck bed or cargo box 11 in accordance with the present disclosure. In some cases, the truck bed or cargo box 11 can be part of a pickup truck 13 as shown.

The tonneau cover 22 of the tonneau cover system 10 can include a plurality of sections 12 that are hingedly coupled together by hinge members 24. In some embodiments, each section 12 of the tonneau cover 22 can comprise a generally rigid panel 14, and can optionally include frame members 31 around the periphery of the rigid panel 14 that can form a rectangular frame 31. In some embodiments, each of the plurality of tonneau sections 12 can alternatively comprise a plurality of frame and/or bow members 31 that together form a rectangular frame 31 supporting a fabric, textile or other flexible sheet material 14 spanning the rectangular frame 31. Other tonneau cover configurations are, of course, possible.

The plurality of sections 12 can include a forward section 26. A remainder of the plurality of sections are rearward sections 28, 30 that can include a second section 28, and a third section 30. The plurality of sections 12 can be hingedly coupled together via the hinge members 24 to be foldable between a deployed, extended or closed configuration covering the cargo box 11 (e.g., FIGS. 1 and 2) and a folded, stacked, or open configuration wherein the rearward sections 28, 30 are stacked upon and overlie the forward section 26 allowing access to the cargo box 11 (e.g., FIG. 5).

When the tonneau cover 22 is in the deployed or extended configuration (e.g., FIGS. 1 and 2), the plurality sections 12 are arranged in a first plane to cover the cargo box 11. In other words, a primary panel plane of each of the plurality sections 12 can all be substantially coplanar with each other and with a first plane, and the first plane can be substantially horizontal.

Figure 2:
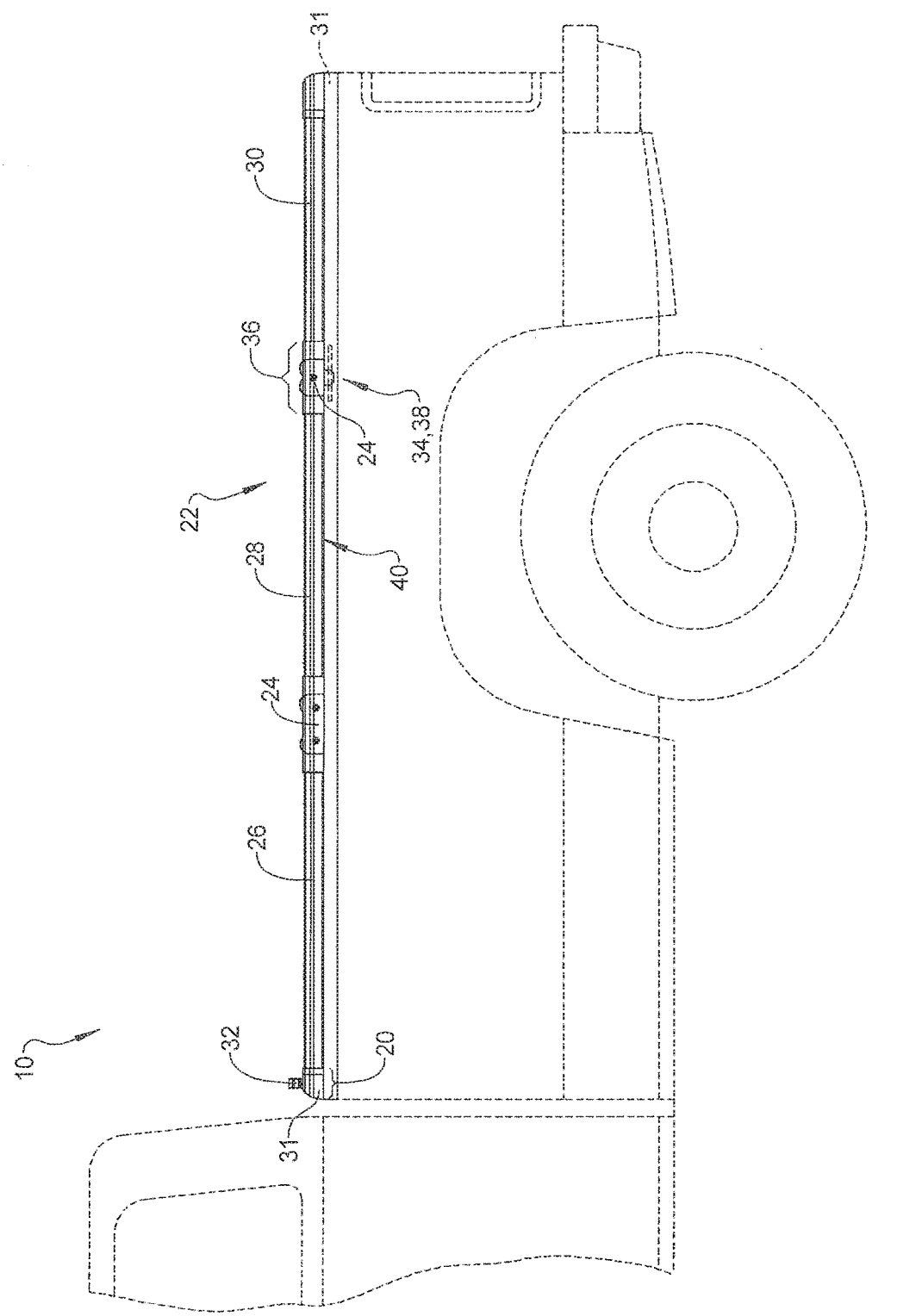
FIG. 2 is a side elevation view of the tonneau cover system of FIG. 1 with the tonneau cover shown in a deployed, extended, or closed configuration.

In some embodiments, first and second or left and right side rails 40 can be coupled to the opposite lateral side walls, or longitudinally extending walls, respectively, of the cargo box 11. Opposite lateral sides of the sections 12 can be supported upon the side rails 40, respectively, in the deployed or closed configuration (FIGS. 1 and 2). In addition, opposite lateral sides of the forward section 26 can be supported upon the side rails 40, respectively, in the open or stacked configuration (FIG. 5).

Figure 3:
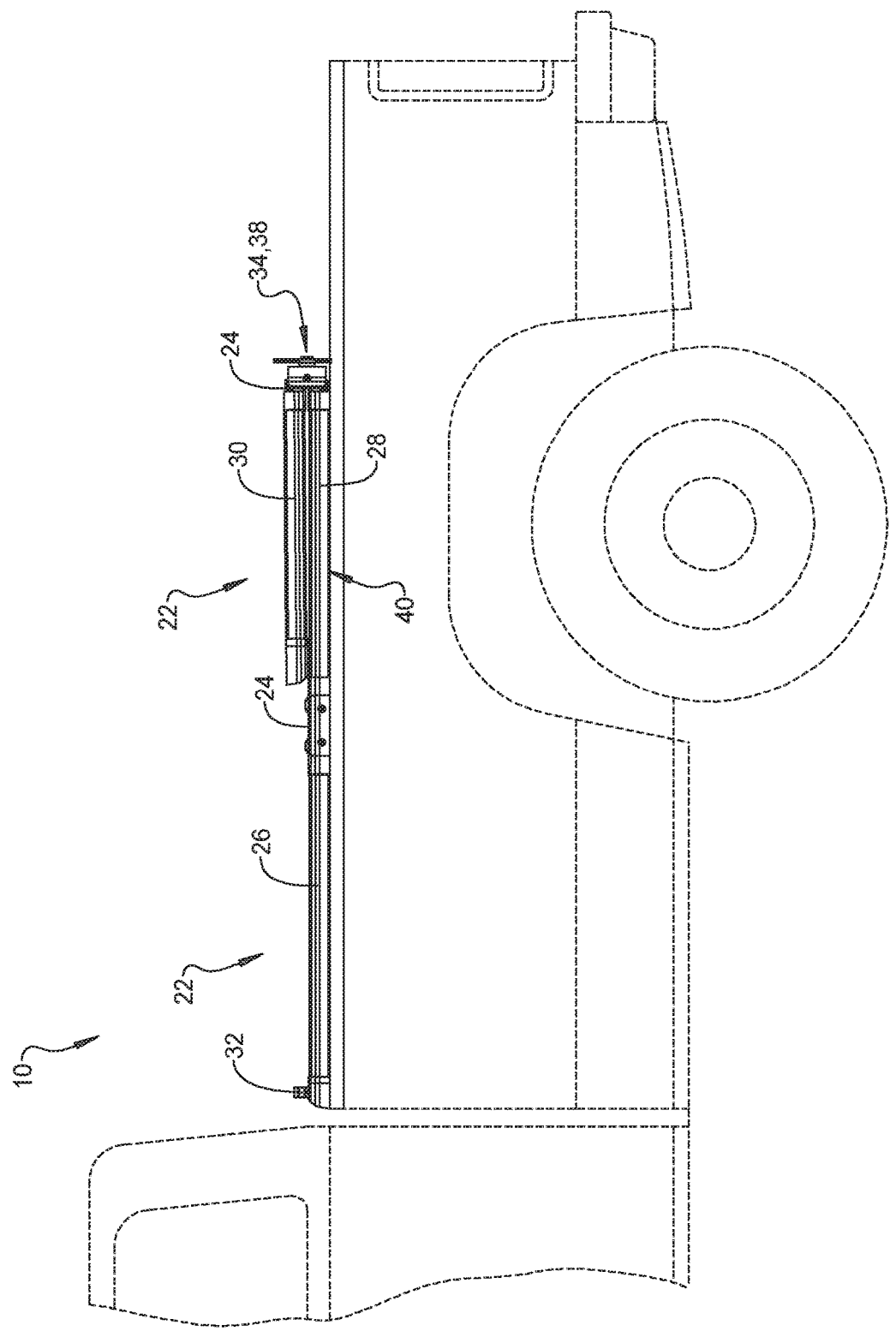
FIG. 3 is a side elevation view similar to FIG. 2 with the tonneau cover in an intermediate folding configuration.
Figure 4:
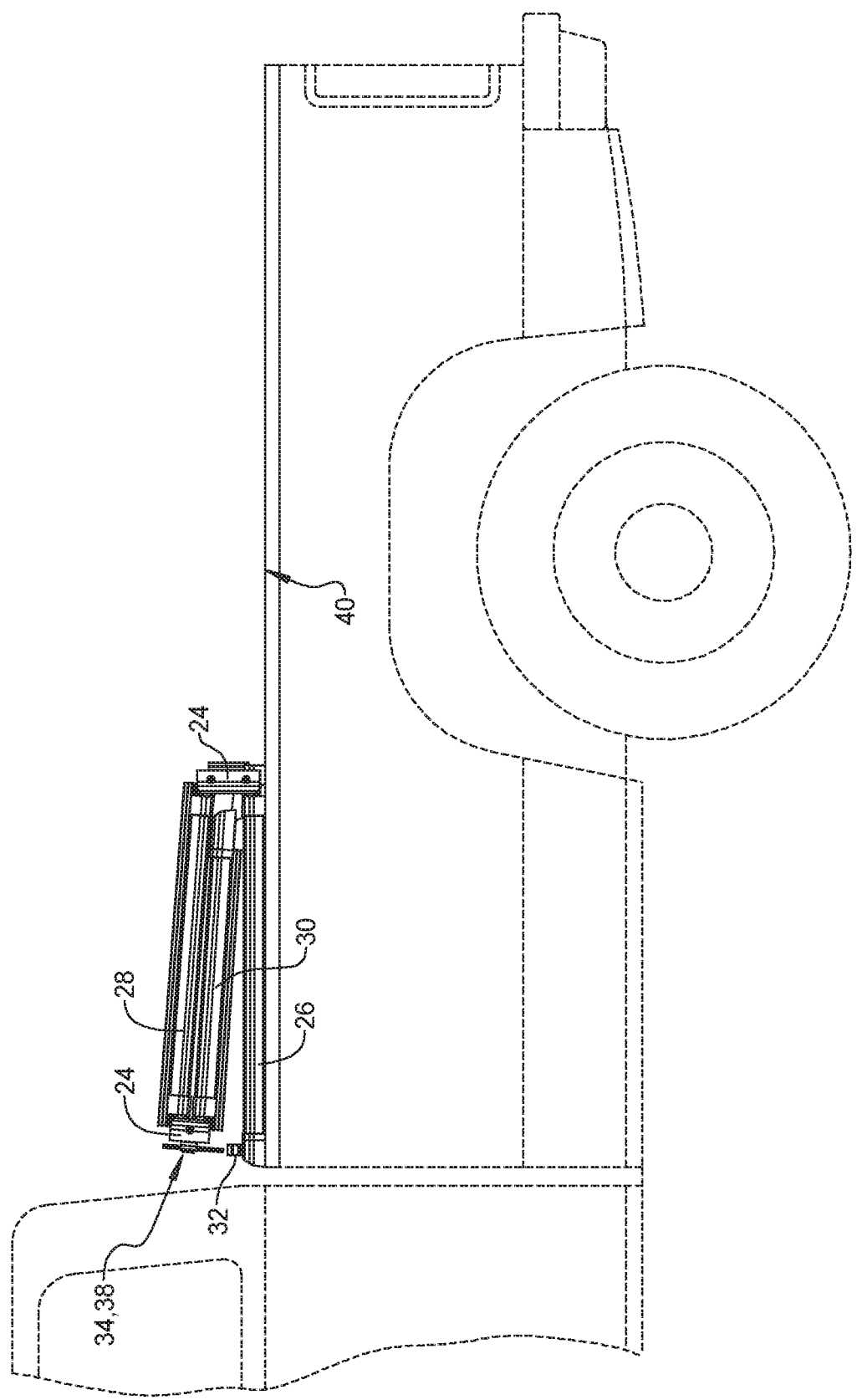
FIG. 4 is a side elevation view similar to FIG. 2 with cooperating locking components of the tonneau cover about to engage with each other.
Figure 5:
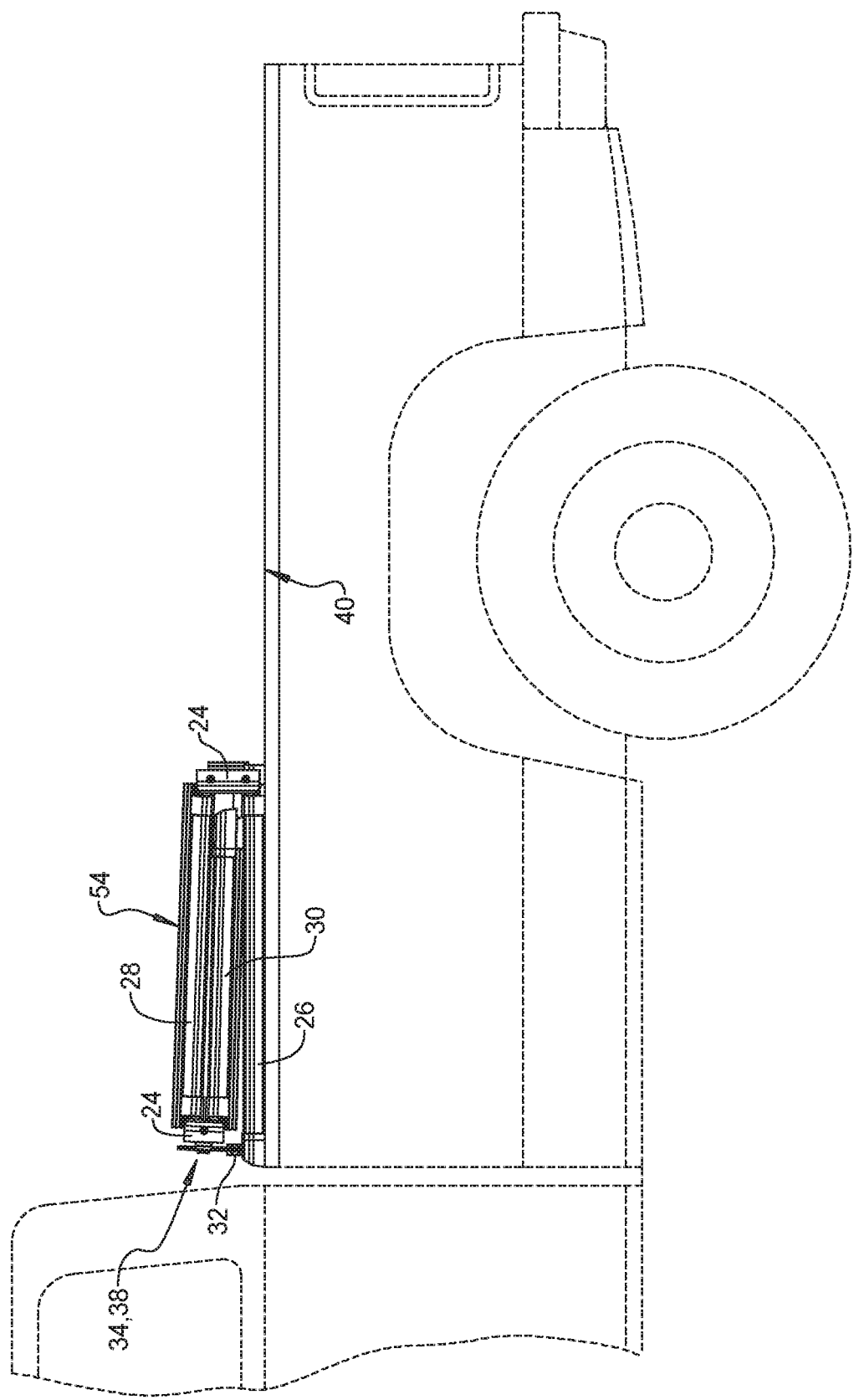
FIG. 5 is a side elevation view similar to FIG. 2 with the tonneau cover in a fully folded, stacked, or open configuration and with the cooperating locking components locked together.
Figure 6:
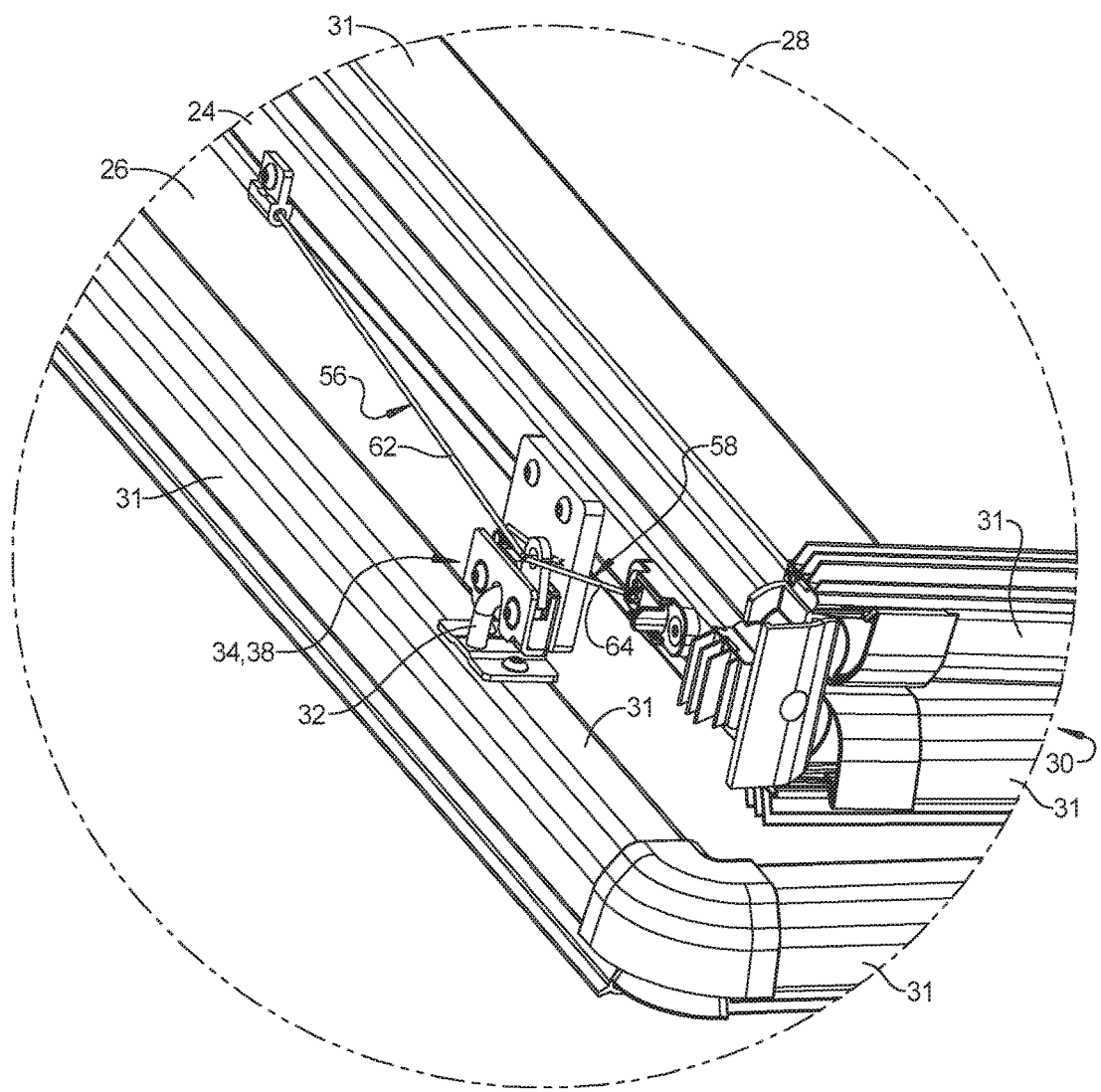
FIG. 6 is a partial perspective view showing one of the pair of cooperating locking elements of the tonneau cover of FIG. 1.
Figure 7:
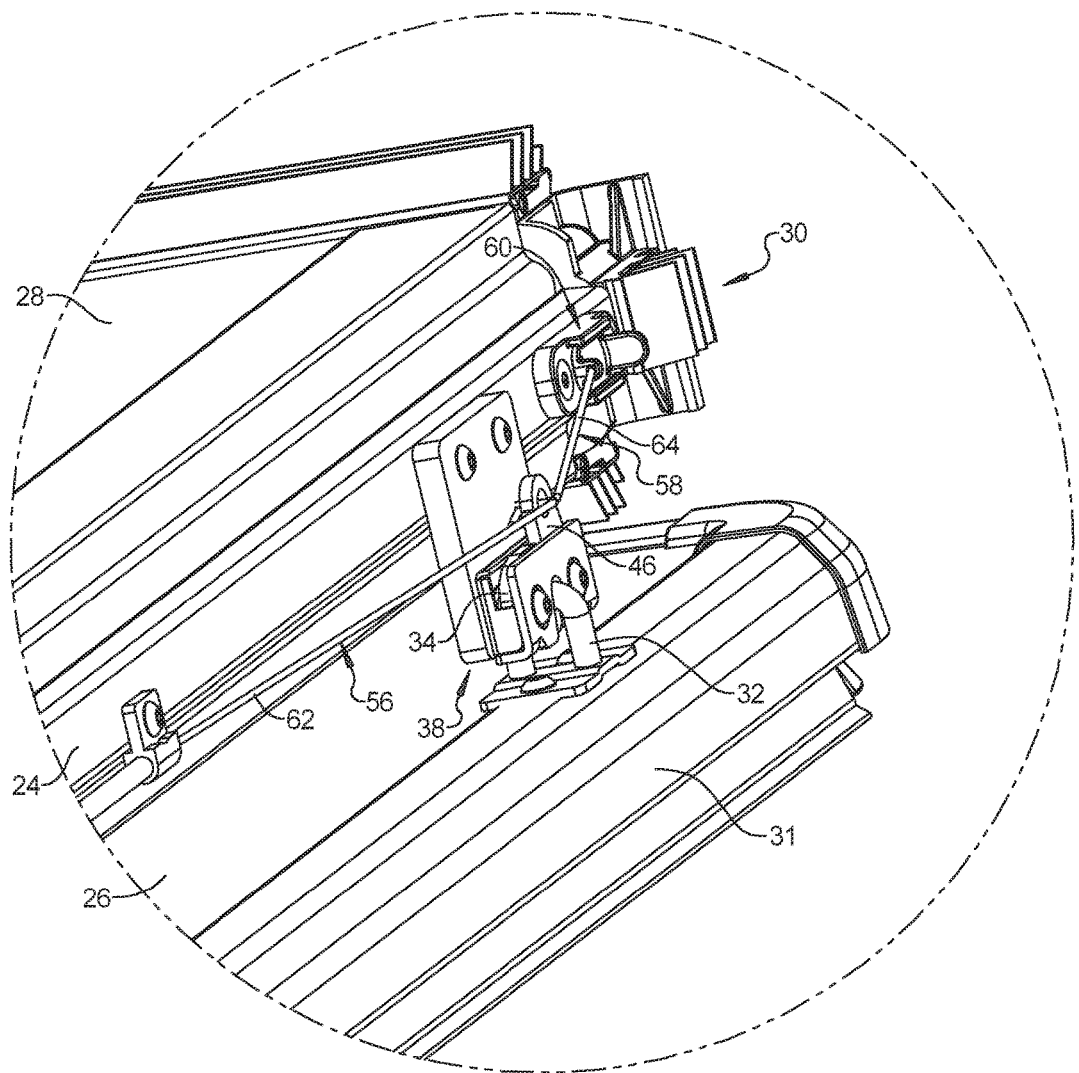
FIG. 7 is another partial perspective view showing one of the pair of cooperating locking elements of the tonneau cover of FIG. 1.

To fold the illustrated tonneau cover 22 from the deployed, extended, or closed configuration of FIGS. 1 and 2 into the stacked or open configuration of FIG. 5, the rear section 30 can be pivoted 180 degrees and folded so the top face of the rear section 30 can be positioned to oppose or face toward the adjacent top face of the middle section 28 as shown in FIG. 3. This pair of folded sections 28, 30 can then be pivoted 180 degrees and folded onto the forward section 26 to form a completely folded stack 54 as shown in FIG. 5. Thus, in some embodiments, the tonneau cover 22 can be spiral folded, and the lowermost section in the stack 54 can be the forward section 26.

A pair of cooperating locking elements 32, 34 is coupled to the tonneau cover 22 with the cooperating locking elements 32, 34 being positioned to engage and automatically lock with each other when the rearward sections 28, 30 are folded onto the forward section 26 into the stack 54. The cooperating locking elements 32, 34 can be designed to automatically lock with each other under the weight of the rearward sections 28, 30 when the rearward sections are folded onto the forward section 26 into the stack 54.

Figure 9A:
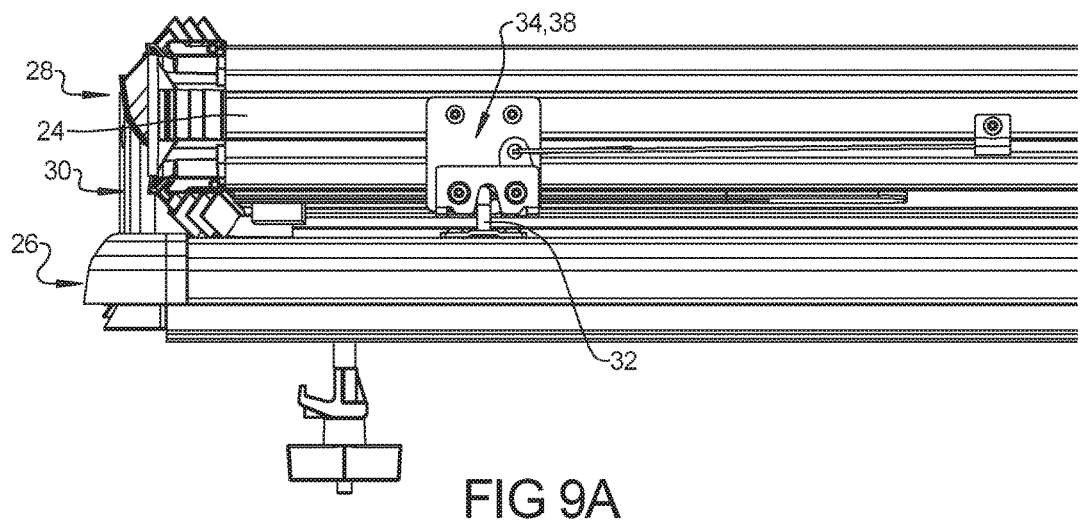
FIGS. 9A and 9B are partial elevation views showing the cooperating locking element related components on opposite sides of the tonneau cover of FIG. 1.
Figure 9B:
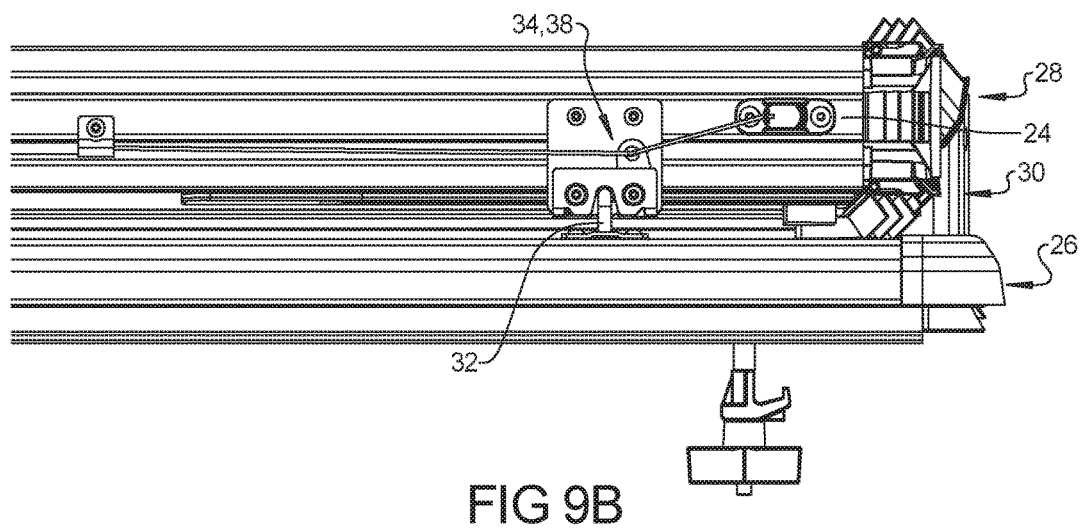
Figure 10:
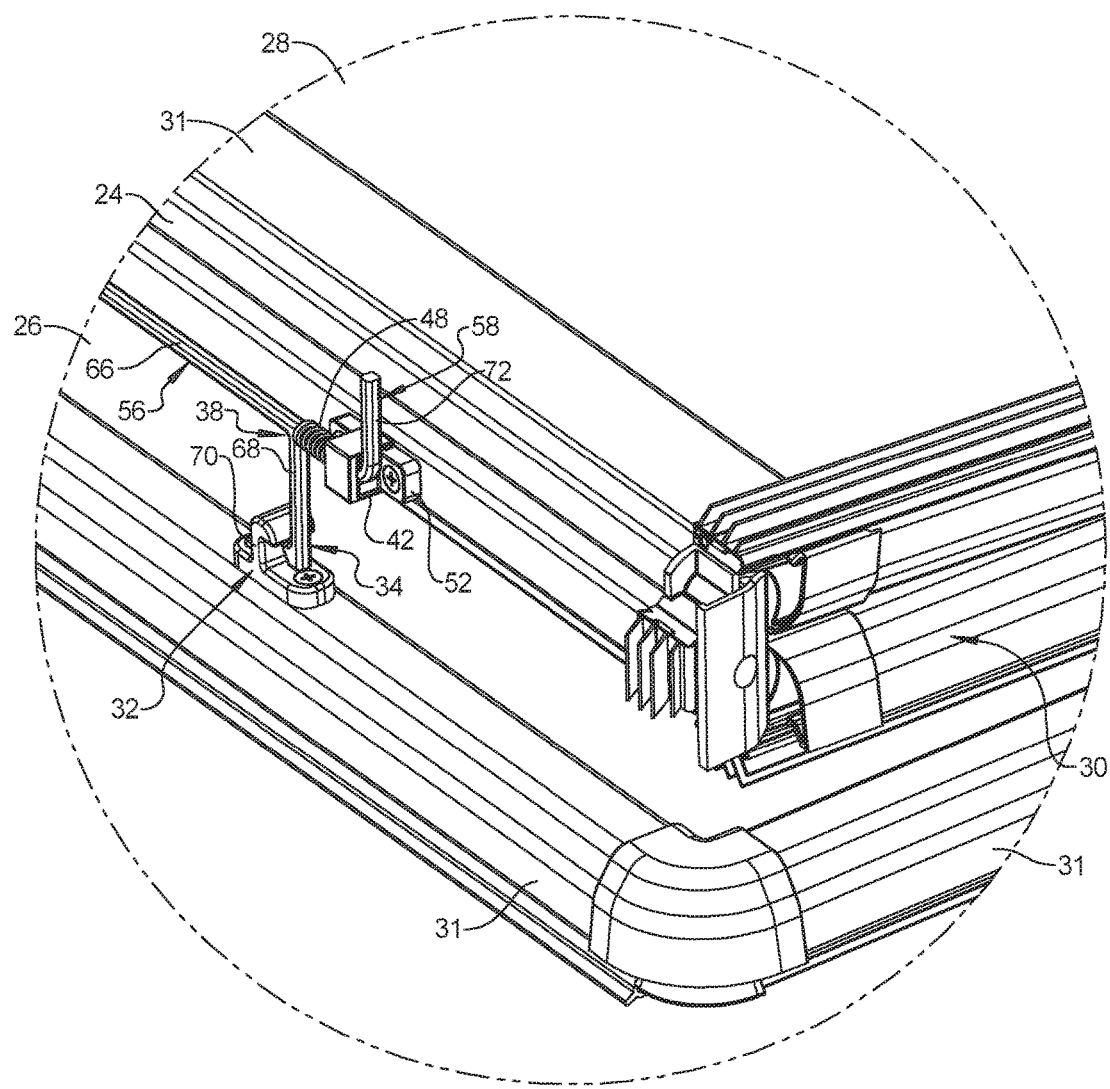
FIG. 10 is a partial perspective view showing one of the tonneau covers with the cooperating locking elements of another example embodiment of a tonneau cover system in accordance with the present disclosure.
Figure 11:
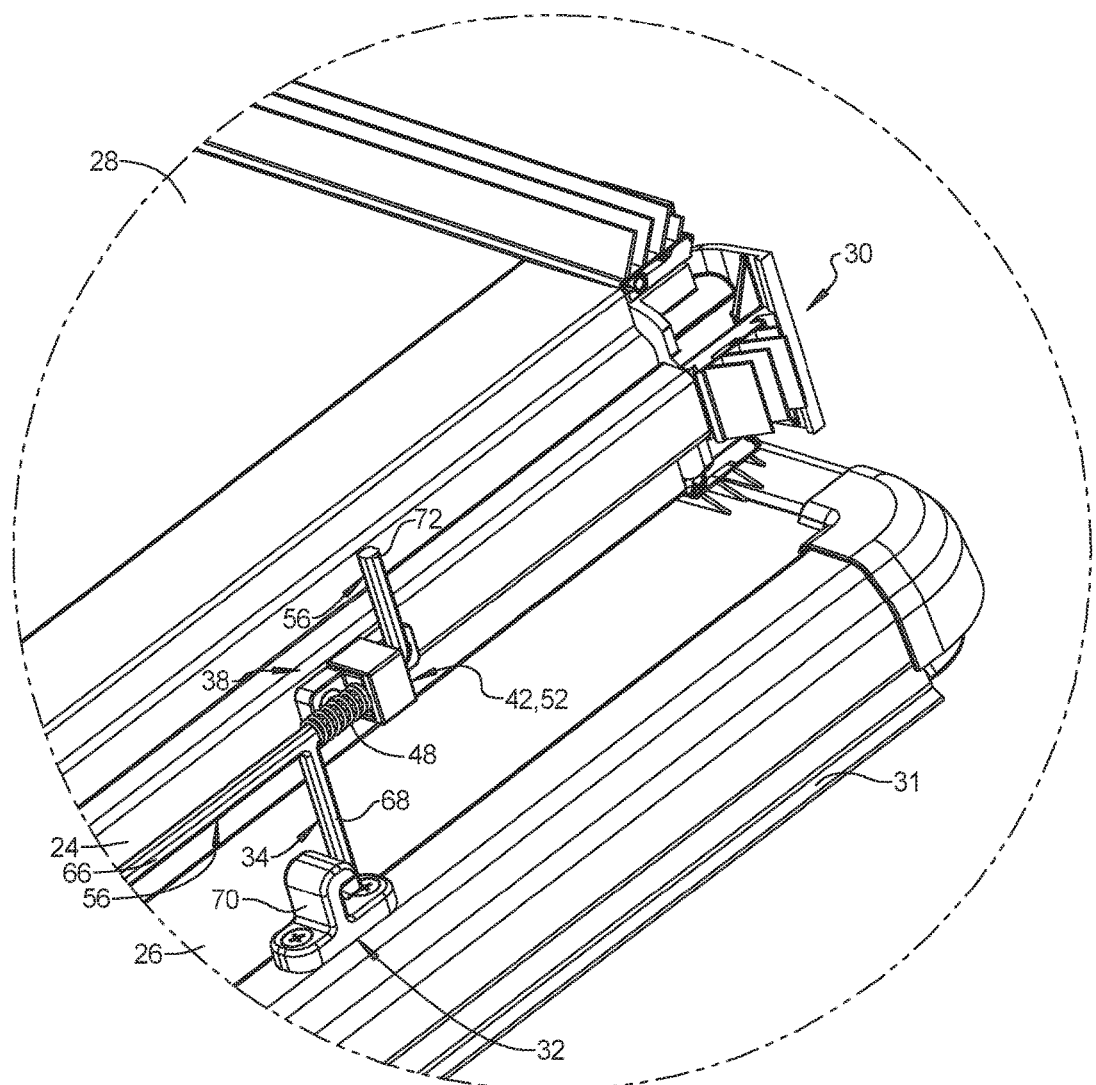
FIG. 11 is another partial perspective view showing one the tonneau covers with the cooperating locking element related components of FIG. 10.
Figure 12:
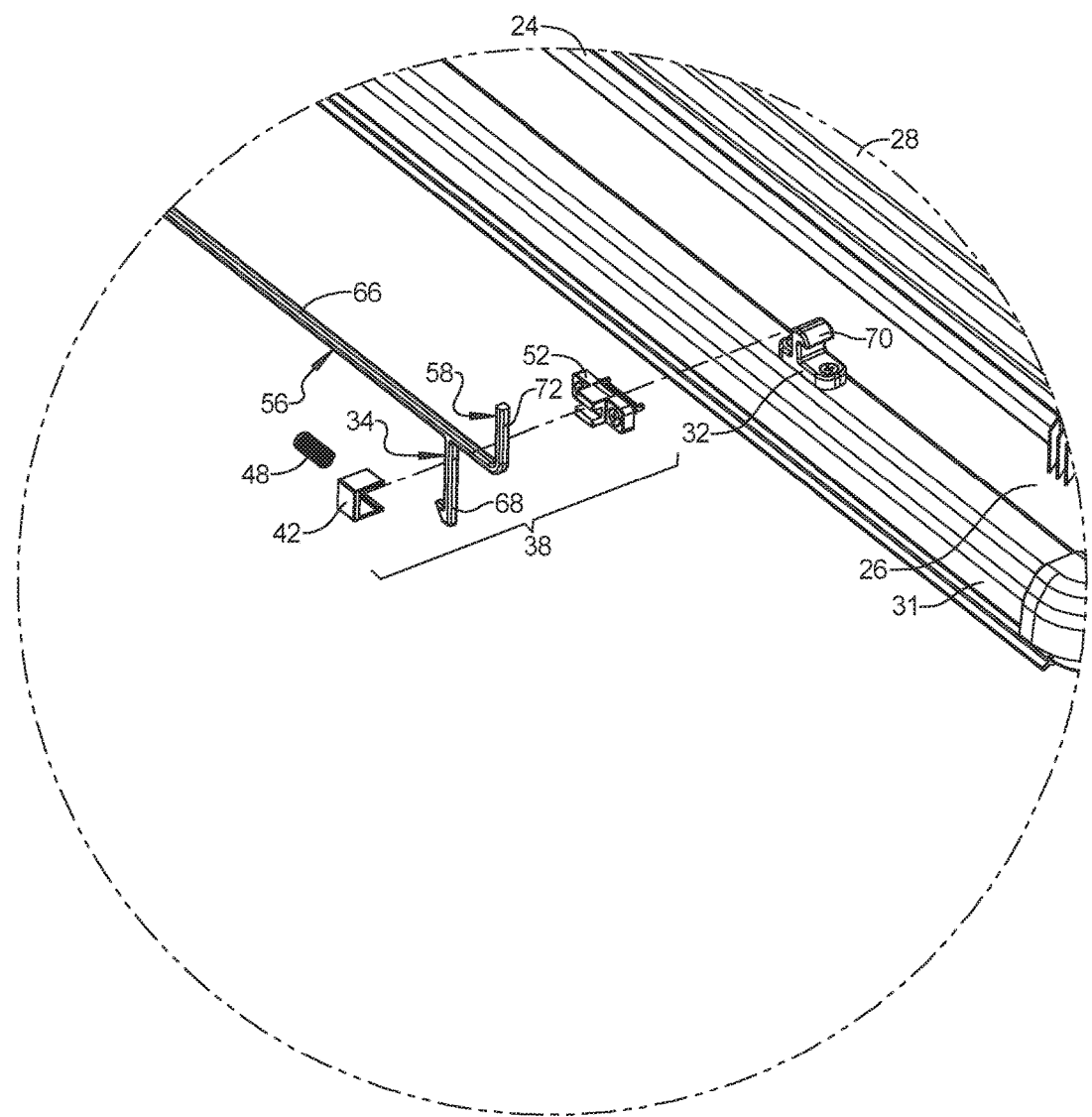
FIG. 12 is a partial exploded perspective view showing one of the tonneau covers with the cooperating locking element related components of FIG. 1.

As in this embodiment, two pairs of cooperating locking elements 32, 34 can be provided. A first pair of cooperating locking elements 32, 34 can be positioned adjacent a first lateral side of the tonneau cover 22 and a second pair of cooperating locking elements 32, 34 positioned adjacent a second, opposite lateral side of the tonneau cover 22 as shown in FIGS. 9A and 9B. The opposite lateral sides of the tonneau cover 22 correspond to the driver and passenger sides of the truck 13. The cooperating locking elements 32, 34 can operate to retain the sections 12 together in the stack 54 when locked or latched together with each other.

As in this embodiment, the first cooperating locking element 32 can be coupled directly to a forward edge 20 of the forward section 26 by being mounted to its forward cross-frame member 31. Alternatively, the first cooperating element 32 can be indirectly coupled to the forward edge 20 of the forward section 26 by being mounted to a front wall of the cargo box 11, or to a header (not shown) or other structure between the front wall of the cargo box 11 and the forward section 26.

As in this embodiment, the first cooperating locking element 32 can be a striker 32 that can have a U-shape and the second cooperating locking element 34 of each pair can be a latch 34 that can operate through pivotal movement. The second cooperating locking element 34 can be coupled to the rearward sections 28, 30 at a hingedly coupled edge 36 of an adjacent pair 28, 30 of the sections 12. As shown, the hingedly coupled edge 36 can include the hinge member 24 and adjacent section edges. For example, the latch 34 can be coupled to the hinge member 24 of the hingedly coupled edge 36 between adjacent sections 12, which can be the rear and middle sections, 30 and 28, respectively. Thus, the striker 32 and latch 34 of each pair can be coupled to the tonneau cover 22 at fore-aft spaced apart locations, with at least one of the sections 12 of the cover 22 being between the fore-aft spaced apart locations.

The second cooperating locking element or latch 34 can also be coupled to the hinge member 24 with a major dimension that extends generally parallel to the first plane (e.g., substantially horizontal) in the closed configuration as shown in FIG. 2. In the open or stacked configuration, this major dimension can extend generally or substantially perpendicular thereto (e.g., substantially vertical) in the open configuration as shown in FIG. 5.

Figure 8:
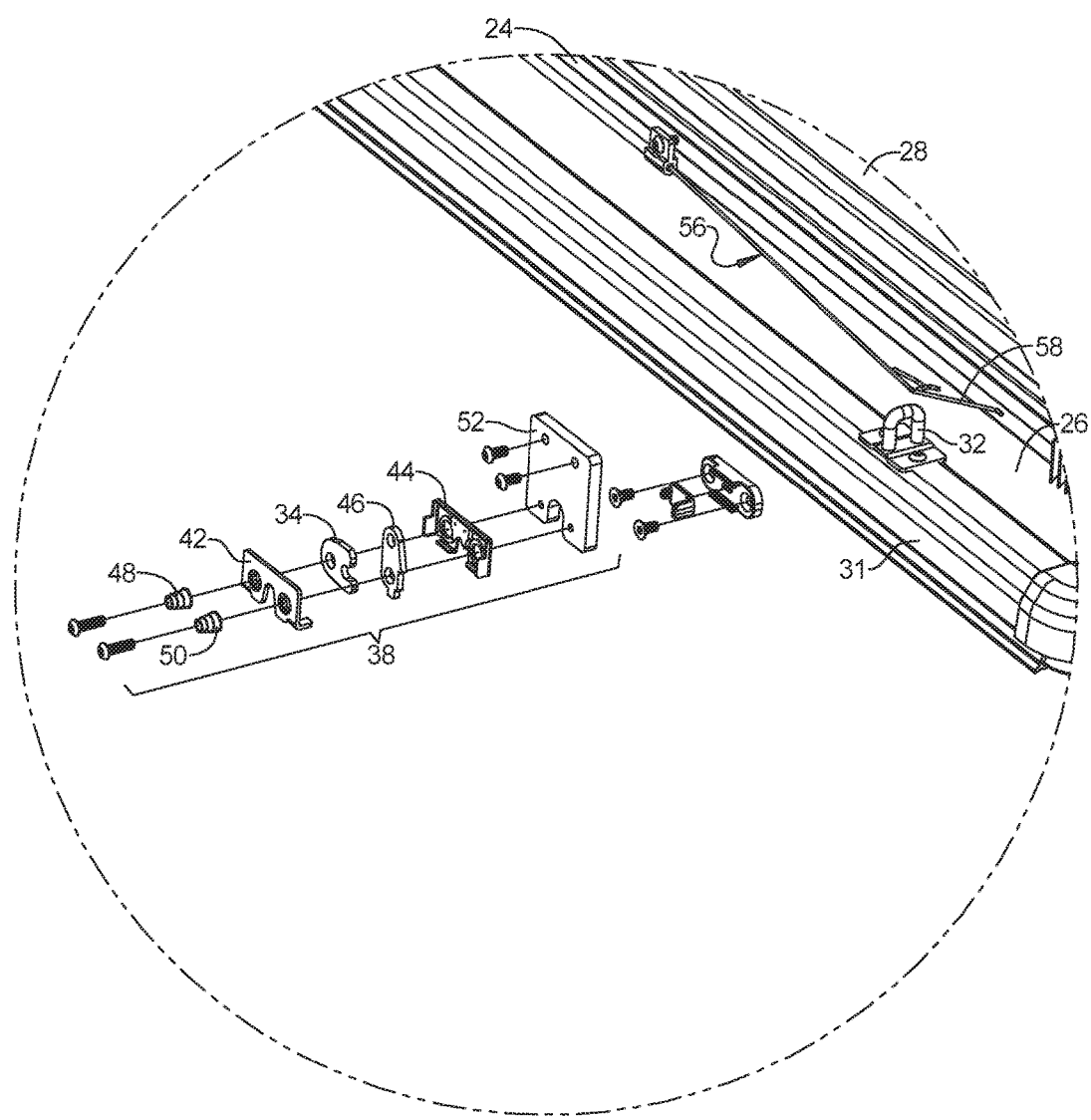
FIG. 8 is a partial exploded perspective view showing one of the pair of cooperating locking elements of the tonneau cover of FIG. 1.

As shown in FIG. 8, each latch 34 can encompass a latch assembly 38 that can include latch brackets or housings 42, 44, a pivoting actuator arm 46, an actuator arm spring or biasing member 48, a latch spring or biasing member 50 for the pivoting latch member 34, and a base 52. The latch biasing member 50 can bias the pivoting latch 34 toward a latched or locked position. Similarly, the actuator arm biasing member 48 can bias the pivoting actuator arm 46 toward engagement with the latch 34. In any event, engagement of the striker 32 against the latch 34 can counteract the biasing member and moves the latch into the lock position relative to the latch so that the cooperating locking elements are latched or locked with each other.

The tonneau cover system 10 can also include an actuator 56 extending between the pairs of cooperating locking elements 32, 34 adjacent the opposite lateral sides of the tonneau cover 22. For example, the actuator 56 is operably coupled between the two latches 34 of the tonneau cover 22 via their corresponding actuator arms 46. Thus, a single actuation of the actuator can unlock both the first and second pairs of cooperating locking elements 32, 34.

As shown in this embodiment, the actuator 56 can be a flexible member such as a cable 62. The actuator 56 can also include a grasping handle 58, which can also be a cable 64, such as an extension of cable 62. A distal end of the grasping handle cable 64 can be anchored to the tonneau cover via an anchor 60. Alternatively, the grasping handle 58 can extend freely. The grasping handle 58 can be positioned adjacent the driver's side of the truck 13. This makes it easy for a driver to simultaneously unlatch both pairs of cooperating locking elements 32, 34 from a single location.

FIGS. 10-13B illustrate a second example embodiment of a tonneau cover system 10 including two pairs of cooperating locking elements 32, 34. In order to avoid unnecessarily repeating the discussion above regarding various common features, identical reference numbers are used to identify corresponding elements of this embodiment, even if these elements are not identically the same in both embodiments. Thus, the discussion above regarding such corresponding elements is likewise applicable to this embodiment. Sometimes different reference numbers may be used for corresponding elements when it facilitates the discussion below.

Figure 13A:
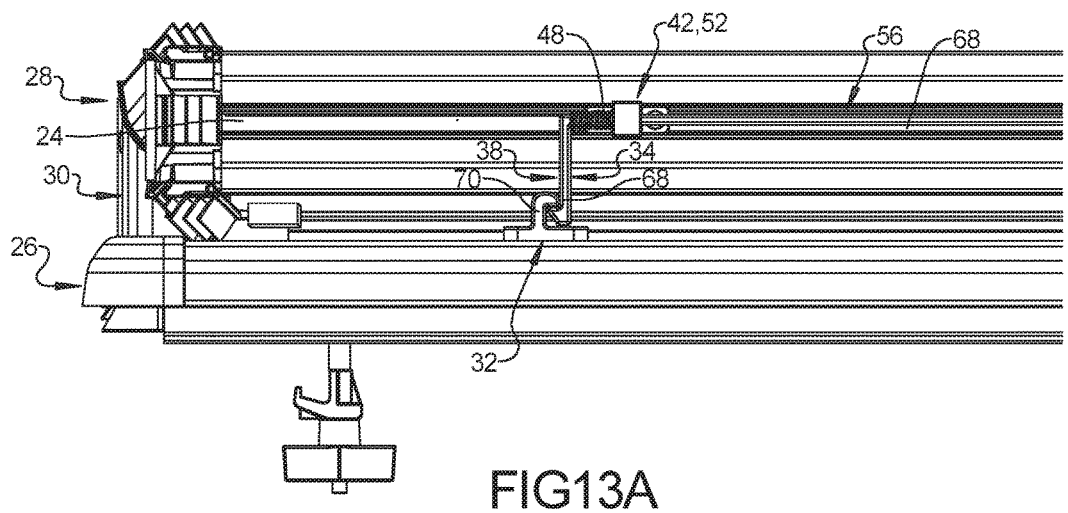
FIGS. 13A and 13B are partial elevation views showing the cooperating locking element related components on opposite sides of the tonneau cover of FIG. 10.
Figure 13B:
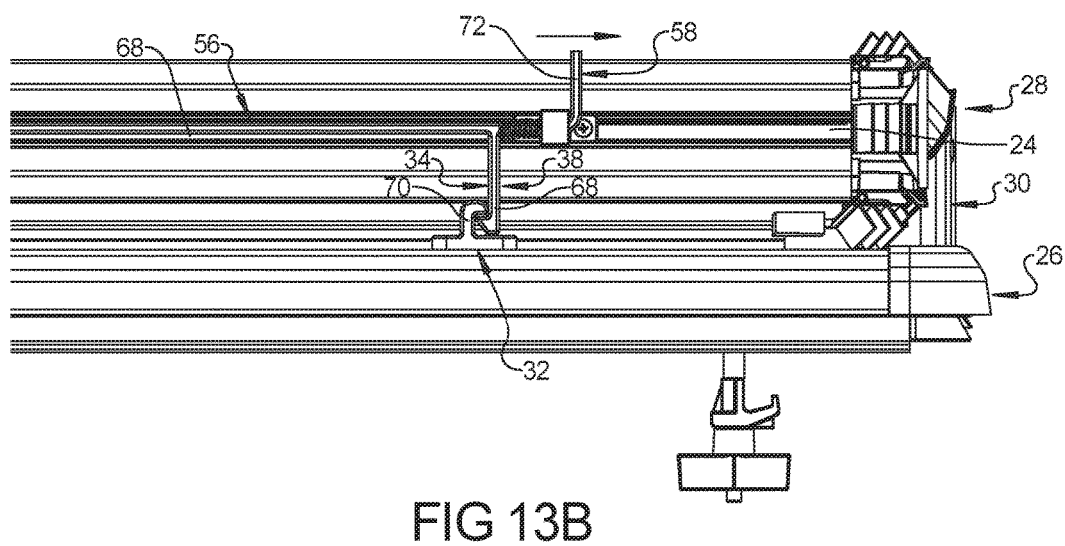

As with the previous embodiment, a first pair of cooperating locking elements 32, 34 can be positioned adjacent a first lateral side of the tonneau cover 22 and a second pair of cooperating locking elements 32, 34 can be positioned adjacent a second, opposite lateral side of the tonneau cover 22 as shown in FIGS. 13A and 13B. In addition, the first cooperating locking element 32 can be a striker 32 and the second cooperating locking element 34 of each pair can be a latch 34.

As in this embodiment, the actuator 56 can be a rigid elongate member 66 that extends between the first and second pairs of the cooperating locking elements 32, 34. Specifically, the latches 34 can be provided as an integral extension of the rigid elongate member 66. The latches 34 can be a hook member 68 with a long support arm and the strikers 32 can be a hook member 70 with a short support arm relative to that of the latch 34. Thus, the rigid elongate member 66 along with the hook members 68 or latches 34 form a generally U-shaped member.

The rigid elongate member 66 can be a bar or rod and can be flat sided. The bar 66 can be mounted to one of the hinge members 24 of a hingedly coupled edge 36 between the middle and rear sections via housing or bracket components 42, 52. The mounting bracket components 42, 52 can be correspondingly flat sides to prevent the rigid elongate member 66 from rotating relative to the mounting bracket 42, 52. Thus, the brackets 42, 52 can engage the U-shaped member 66, 68 to prevent rotational movement of the U-shaped member 66, 68 relative to the brackets 42, 52.

The mounting brackets 42, 52, however, can allow longitudinal slidable movement of the rigid elongate member 66. A spring 48 can be operably mounted on the elongate member 66 between the mounting bracket 42, 52 and the hook member 68 of the latch 34. Thus, the latch assembly 38 of this embodiment can include the mounting brackets 42, 52, the biasing member 48 and the hook member 68 or latch 34. In addition, the biasing members 48 can be mounted between the mounting bracket 42, 52 and the U-shaped member provided by the rigid elongate member 66 and the hook members 68 or latches 34.

The springs 48 can bias the actuator 56 and the latches 34 or first cooperating locking elements 34 toward a locked position. During latching, engagement of each pair of cooperating locking elements 32, 34 with each other initially counteracts the biasing members 48. Thereafter the biasing members 48 provide a biasing force that moves each pair of cooperating locking elements 32, 34 or hooks 68, 70 into a lock position in which each pair of cooperating locking elements 32, 34 are locked with each other.

The actuator can include a grasping handle adjacent the first lateral side of the tonneau cover 20, which can correspond to the driver's side of the truck 13. Similar to the latch hooks 68, the grasping handle 58 can be integrated with the elongate member 66. For example, the grasping handle 58 can be a rigid bent extension 72 of the rigid elongate member 66. Thus, the rigid bent extension 72 of the grasping handle 58 can additionally operate as a stop to help retain the actuator 56 and latches 34 within the mounting brackets 42, 52.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tonneau cover system for a cargo box of a truck, the cargo box having a forward end, the tonneau cover system comprising:
a tonneau cover including a plurality of sections hingedly coupled together, the plurality of sections including a forward section and a plurality of rearward sections;
the tonneau cover being foldable between a closed configuration in which the plurality of sections are arranged in a first plane to cover the cargo box and an open configuration in which the plurality of sections are arranged in a stack with the rearward sections stacked upon the forward section;
at least one pair of cooperating locking elements coupled to the tonneau cover with the cooperating locking elements being positioned to engage and automatically lock with each other when the rearward sections are folded onto the forward section in the stack, the cooperating locking elements retaining the sections together in the stack when locked with each other.

2. The tonneau cover system of claim 1, wherein the forward section is mountable adjacent the forward end of the cargo box and a first of each pair of cooperating locking elements is coupled to a forward edge of the forward section.

3. The tonneau cover system of claim 2, wherein a second of each pair of cooperating locking elements is coupled to the rearward sections at a hingedly coupled edge of an adjacent pair of the plurality of sections.

4. The tonneau cover system of claim 3, wherein the second of each pair of cooperating locking elements is coupled to a hinge at the hingedly coupled edge of the adjacent pair of the plurality of sections.

5. The tonneau cover system of claim 3, wherein the second of each pair of cooperating locking elements comprises a latch with a major dimension that extends generally parallel to the first plane in the closed configuration and extends generally perpendicular thereto in the open configuration.

6. The tonneau cover system of claim 1, wherein a first of each pair of cooperating locking elements is a striker and a second of each pair of cooperating locking elements comprises a latch.

7. The tonneau cover system of claim 1, wherein the cooperating locking elements are designed to automatically lock with each other under the weight of the rearward sections when the rearward sections are folded onto the forward section in the stack.

8. The tonneau cover system of claim 1, wherein the pair of cooperating locking elements are coupled to the tonneau cover at fore-aft spaced apart locations, and at least one of the sections in the stack being positioned between the fore-aft spaced apart locations.

9. The tonneau cover system of claim 1, further comprising at least one biasing member biasing a first of each pair of cooperating locking elements toward a locking position.

10. The tonneau cover system of claim 1, wherein the tonneau cover further comprises a cab rail forward of the forward section and a first of each pair of cooperating locking elements is coupled to a forward edge of the forward section by being mounted to the cab rail.

11. The tonneau cover system of claim 1, wherein the plurality of sections comprises a plurality of rigid panels.

12. The tonneau cover system of claim 1, wherein the cooperating locking elements comprises a first pair of cooperating locking elements positioned adjacent a first lateral side of the tonneau cover and a second pair of cooperating locking elements positioned adjacent a second, opposite lateral side of the tonneau cover.

13. The tonneau cover system of claim 12, further comprising an actuator coupling the pairs of cooperating locking elements together, and wherein actuation of the actuator simultaneously unlocks both the first and second pairs of cooperating locking elements.

14. The tonneau cover system of claim 13, wherein the actuator includes a grasping handle adjacent the first lateral side of the tonneau cover, which first lateral side is positionable adjacent a driver's side of the truck.

15. The tonneau cover system of claim 13, wherein the actuator comprises an cable extending between the first and second pairs of cooperating locking elements.

16. The tonneau cover system of claim 13, wherein the actuator includes a grasping handle adjacent the first lateral side of the tonneau cover, which first lateral side is positionable adjacent a driver's side of the truck and wherein the grasping handle comprises a flexible tether.

17. The tonneau cover system of claim 6, wherein the latch comprises a latch assembly including a pivoting latch and an independently pivoting actuator, wherein each of the pivoting latch and pivoting actuator is biased by a spring.

18. The tonneau cover system of claim 13, wherein the actuator comprises a rigid elongate member extending between the first and second pairs of cooperating locking elements.

19. The tonneau cover system of claim 18, wherein the actuator includes a grasping handle adjacent the first lateral side of the tonneau cover, which first lateral side is positionable adjacent a driver's side of the truck and the grasping handle comprises an extension of the rigid elongate member.

20. The tonneau cover system of claim 6, wherein the latch comprises a hook member having a relatively long support arm and the striker comprises a hook member having a relatively short support arm.

21. The tonneau cover system of claim 1, wherein a U-shaped member carries a first of each pair of cooperating locking elements.

22. The tonneau cover system of claim 21, wherein a pair of brackets slidably couple the U-shaped member to the tonneau cover.

23. The tonneau cover system of claim 22, further comprising a biasing member between the U-shaped member and at least one of the brackets to bias the first locking element of each pair of cooperating locking elements toward a locked position.

24. The tonneau cover system of claim 22, wherein at least one of the brackets engages the U-shaped member to prevent rotational movement of the U-shaped member relative to the brackets.

25. The tonneau cover system of claim 1, wherein each pair of cooperating locking elements comprises a pair of hook members.

26. The tonneau cover system of claim 1, further comprising at least one biasing member biasing a first of each pair of cooperating locking elements toward a locking position, and wherein engagement of each pair of cooperating locking elements with each other initially counteracts the biasing member, and thereafter the biasing member moves each pair of cooperating locking elements into a lock position in which each pair of cooperating locking elements are locked with each other.

* * * * *

UNITED STATES PATENT AND TRADEMARK OFFICE
CERTIFICATE OF CORRECTION

PATENT NO.          : 10,328,780 B2                                    Page 1 of 1
APPLICATION NO.     : 15/683194
DATED               : June 25, 2019
INVENTOR(S)         : DeLong It is certified that error appears in the above-identified patent and that said Letters Patent is hereby corrected as shown below:

In the Claims

Column 8, Line 18, In Claim 15, delete "an" and insert --a-- therefor

Signed and Sealed this
Twentieth Day of August, 2019

Andrei Iancu
*Director of the United States Patent and Trademark Office*